United States Patent
Wolleschensky et al.

(10) Patent No.: US 7,488,931 B2
(45) Date of Patent: Feb. 10, 2009

(54) OPTICAL ZOOM SYSTEM FOR A LIGHT SCANNING ELECTRON MICROSCOPE

(75) Inventors: Ralf Wolleschensky, Apolda (DE); Joerg Steinert, Jena (DE); Michael Goelles, Jena (DE); Kristina Uhlendorf, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 515 days.

(21) Appl. No.: 10/967,318

(22) Filed: Oct. 19, 2004

(65) Prior Publication Data
US 2006/0011832 A1    Jan. 19, 2006

(30) Foreign Application Priority Data
Jul. 16, 2004    (DE) .................. 10 2004 034 990

(51) Int. Cl.
 H01J 3/14        (2006.01)
 G02B 21/06    (2006.01)
(52) U.S. Cl. ............... 250/234; 250/216; 250/201.3; 359/368; 359/380
(58) Field of Classification Search ............ 250/216, 250/234, 201.3; 359/368, 379, 380, 385, 359/676, 686
See application file for complete search history.

(56) References Cited

U.S. PATENT DOCUMENTS

| | | | |
|---|---|---|---|
| 3,876,289 A | 4/1975 | DeVeer et al. | |
| 3,947,084 A | 3/1976 | Noyes | |
| 4,734,578 A | 3/1988 | Horikawa | |
| 5,184,012 A | 2/1993 | Yamamoto | |
| 5,337,187 A | 8/1994 | Fukino et al. | |
| 6,028,306 A | 2/2000 | Hayashi | |
| 6,167,173 A | 12/2000 | Schoeppe et al. | |
| 6,285,019 B1 | 9/2001 | Engelhardt et al. | |
| 2002/0167723 A1 | 11/2002 | Eda et al. | |
| 2003/0035208 A1 | 2/2003 | Engelhardt | |
| 2003/0142292 A1 | 7/2003 | Wolleschensky et al. | |
| 2003/0202254 A1 | 10/2003 | Kanai | |
| 2003/0210470 A1 | 11/2003 | Zimmer et al. | |
| 2006/0049343 A1* | 3/2006 | Wolleschensky et al. | 250/234 |

FOREIGN PATENT DOCUMENTS

| | | |
|---|---|---|
| DE | 2360197 A1 | 6/1975 |
| DE | 19702753 A1 | 7/1998 |
| DE | 19654211 A1 | 8/1998 |
| DE | 10257237 A1 | 6/2003 |
| EP | 0539691 A2 | 8/1992 |
| JP | 05 142475 A | 6/1993 |
| JP | 11 202 217 A | 7/1999 |
| WO | WO88007695 | 10/1988 |
| WO | WO99/36822 A1 | 7/1999 |

OTHER PUBLICATIONS

Patent Abstracts of Japan Bd. 017, Nr. 526 (P-1617), Sep. 21, 1993.
* cited by examiner

*Primary Examiner*—Kevin Pyo
(74) *Attorney, Agent, or Firm*—Jacobson Holman PLLC

(57) ABSTRACT

For a confocal scanning electron microscope (1) an optical zoom system (41) with linear scanning is provided, which not only makes a zoom function possible, in that a variable magnification of an image is possible, but rather which additionally produces a pupil image in the illuminating beam path (IB) [BS] and thereby makes a variable imaging length possible (distance between the original pupil (En.P) [EP] and the imaged/reproduced pupil (Ex.P) [AP]) so that axially varying objective pupil positions can thereby be compensated.

14 Claims, 6 Drawing Sheets

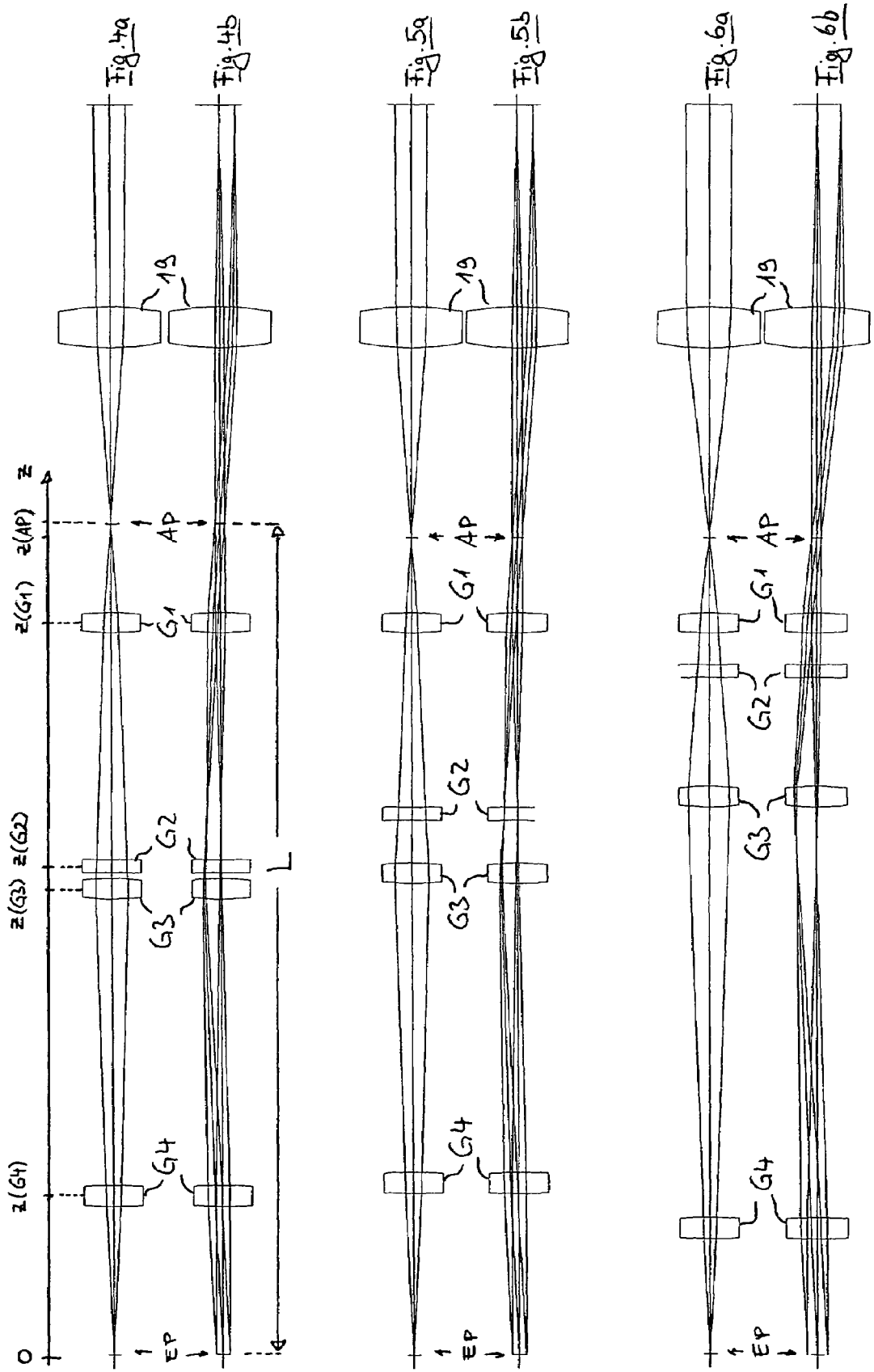

OPTICAL ZOOM SYSTEM FOR A LIGHT SCANNING ELECTRON MICROSCOPE

BACKGROUND OF THE INVENTION

1. Field of the Invention

The invention relates to an optical zoom system for a confocal scanning electron microscope as well as to a confocal scanning electron microscope with such an optical zoom system.

2. Related Art

Confocal scanning electron microscopes, which are normally constructed as laser scanning microscopes, are known in the state of the art, for example, let us cite patent DE 197 02 753 A1 in reference thereto. Most recently, components and technical systems from microscopy, specifically from confocal imaging laser scanning microscopes, have been ever more frequently applied to spectroscopic imaging techniques. In this manner, it is possible to survey the spectroscopic characteristics of a selected specimen region without destroying or touching the probed area. Confocal optic microscopy thereby makes it possible to selectively detect optical signals, which are generated within a confocal volume with limited diffraction whose magnitude lies in the realm of micrometers. Laser scanning microscopes with scanning laser beams and/or with probing feed units can generate high focal resolution for two or three dimensional representations of the specimen under examination. Owing to this characteristic, confocal laser scanning microscopy has nearly asserted itself as the standard for fluorescent probes in the field of biomedical technology.

Normally, laser scanning microscopes are used with interchangeable objectives. Thereby, the problem frequently arises that it is only with great difficulty that constant pupil positions along the optical axis can be achieved within a series of objectives. In some cases, axial differences of 40 mm can occur in the objective chamber, which can be shortened in the conjugate space of the scanning configuration between the scan mirrors by up to 4 mm. Lateral straying of the illuminating beam cone from the pupil associated with such a mismatch of the pupil's position can lead to non-uniform illumination of the specimen during scanning.

SUMMARY OF THE INVENTION

The object of the invention is therefore to create an optical configuration for a confocal scanning electron microscope with which the problems associated with the axially varying pupil position can be eliminated.

This task is resolved in accordance with the invention with an optical zoom system for a confocal scanning electron microscope, which, in the illuminating beam path of the microscope, is connected in front of the objective capturing the object, which produces an intermediate image of the object and images an entrance pupil of the illuminating beam path with variable magnification and/or with variable imaging length into an exit pupil.

The inventors recognized that the problems associated with the axially varying position (in the direction of illumination) of the entrance pupil of the microscope objective could surprisingly be resolved by the appropriate design of the optical zoom system. Such an optical zoom system was indeed known in the state of the art, however, from entirely different perspectives:

Laser scanning microscopes generate a specimen image in that an illuminating beam is guided over a specimen during scanning by means of a scanning arrangement and by means of a detector arrangement, which forms the image of the illuminated specimen region via the scanning arrangement by means of a confocal aperture, the irradiation originating from the illuminated spot is absorbed. The diameter of the confocal aperture determines the depth resolution and the focal resolution. The position of the confocal aperture establishes the sectional plane position in the specimen. The patent DE 196 54 211 A1 uses an optical zoom system to adjust the effective diameter of the confocal aperture or for the selection of the sectional plane position.

For laser scanning microscopes, the scanned image region can be selected by the proper control of the scanner in its zoom function, but only in the case of point to point scanning, in combination with a galvanometer scanner. In the case of parallel scanning, that is to say, scanning of several points at the same time by laser scanning microscopes, zoom function cannot be achieved by a change in the setting of the scanning arrangement since, as a rule, the individually scanned points stand in an established geometric relation to one another that is already predetermined by the configuration of the perforations in the disc, such as, for example, in the Nipkow disc, or predetermined by the aperture plate geometry in the case of a multiple pinhole aperture configuration.

The U.S. Pat. No. 6,028,306 describes such a laser scanning microscope which realizes a source for multiple spot illumination by means of a stationary confocal multiple pinhole aperture configuration, which is designed in the form of a plate with a multitude of perforations. An optical zooming unit is connected in front of the scanning arrangement, which makes it possible to magnify or scale down the multiple spot illumination. In this manner, a region of the specimen may be scanned based on a selectable size.

Such an optical zoom system known for other applications in the state of the art is used in accordance with the invention now to variably control the imaging length (the distance between the entrance pupil and the exit pupil on the optical zoom system), whereby fluctuations in the axial pupil position of the entrance pupil of the microscope objective can be equilibrated. This approach is surprising for the very reason that said construction known from the German patent DE 196 54 211 A1 does not cover the position of the pupil in the microscope as its subject matter and neither does the microscope in the U.S. Pat. No. 6,028,306. The optical zoom system in accordance with the invention therefore achieves a double function in that, on the one hand, the scanning field parameters can be adjusted by varying the magnification, and on the other hand, the transmission length can be adjusted in such a manner that an axially varying pupil position on the microscope's objective can be compensated for.

The variable magnification attained by the optical zoom system also makes it possible to change the magnification setting of the scanned field and does so specifically for multiple spot scanners operating in parallel, in which a zoom function based on intervention at the level of the scanning arrangement is not possible due to the fixed geometric interrelation of the points projected in parallel over the specimen. The known approach of controlling spot to spot scanning in confocal scanning electron microscopes in such a manner that an image field is scanned in the desired and adjustable magnification is just as impossible in such parallel scanning systems as it is in systems that operate with resonance scanners, that is to say, in rotating mirrors driven by resonance vibrations, since the maximum deflection available there cannot be adjusted.

A possible form of embodiment for parallel operating multiple spot scanners is represented, for example, by the known application of a Nipkow disc, as revealed in the mentioned U.S. Pat. No. 6,028,306 or in WO 8807695 or also in the European patent EP 0 539 691 A1. Beyond that, the mentioned US patent specification depicts a laser scanning microscope that scans in parallel with a multiple pinhole aperture plate which is preconnected to a corresponding microlens array such that a multiple point source is generated in the end effect. This process also lends itself for a form of embodiment of the optical zoom system. Another conceivable approach for scanning a specimen by means of parallel laser scanning microscopy, that is to say, for simultaneous scanning of multiple points, is presented by the use of a confocal slotted aperture.

The present zoom configuration is therefore particularly advantageous for application in a confocal scanning electron microscope which is realized with confocal multiple point imaging, in particular by means of a Nipkow disc, of a confocal slotted aperture or of a multiple point light source.

An advantageous application of an optical zoom system in accordance with the invention is furthermore provided by a confocal scanning electron microscope that exhibits a resonance scanner.

An objective achieves its maximum resolution in the case when the entrance pupil is fully illuminated. It is therefore purposeful to provide the appropriate means to ensure that the optical zoom system always fully illuminates the entrance pupil of the objective, regardless of the setting on the optical zoom system. As a consequence, another purposeful embodiment of the invention provides for the arrangement of an element acting as an aperture in the exit pupil of the optical zoom system, said element not being larger than the smallest exit pupil size, which occurs when the optical zoom system is in operation. As a result of this, the size of the entrance pupil is independent from the selected setting on the optical zoom system. Said size is purposefully equal or smaller than the size of the objective's entrance pupil.

During operation of the optical zoom system, the exit pupil can become very small when magnification is set to less than 1.0. If one wishes to avoid this very small exit pupil size as the lower value limit for the design, then it is purposeful to connect a telescope in front of the optical zoom system which shall affect the corresponding pupil dilation. Purposefully, this telescope shall only be activated during beam sweep when the optical zoom system operates in the scaled down mode. In this context, the concepts of "magnify" and "scale down" here relate to the image of the specimen.

The activation of this telescope ensures that the exit pupil of the zoom, which is provided at a magnification of 1.0, can be established as the lower limit for the design without causing the exit pupil to become so small during scaled down mode of the optical zoom system that the objective's pupil might possibly become underfilled. Based in the interchangeability of the objective, it is purposeful to design the element operating as an aperture as being interchangeable if one intentionally wishes to underfill the objective's pupil, that is to say, not to fully illuminate. In that case, for example, an adjustable iris diaphragm or a mechanism with different interchangeable apertures would come under consideration such as, for example, a focal wheel with different pinhole apertures.

In an especially compactly built form of embodiment, the element acting as a lens aperture is realized by the scanning unit; for example, the limited dilatation of the scanner mirrors can act as a lens aperture.

As previously mentioned, the optical zoom system in accordance with the invention can adjust the length of the image in such a manner that an axially varying pupil position of the entrance pupil of the objective can be equilibrated. It is therefore purposeful that the optical zoom system is controlled by a control unit to be adjustable in such a manner that in a first mode of operation, a variable image length is produced. In order to adapt the optical zoom system to an activated objective, such as to a pivoting objective, it is purposeful to maintain magnification at a constant in this mode of operation.

Once the setting for the position of the pupil is in place, another mode of operation can be advantageously realized in which the magnification is set by guidance of the control unit so as to implement a zoom function without varying the image length. By virtue of the action of the optical zoom system in this mode of operation, the scanned field can be adjusted in terms of its size. If one synchronously uses a controllable double axis scanning unit, then in addition to and depending on the adjustment change in zoom magnification, a random region can be selected within the maximum permissible scanning field as a so-called "region of interest", whereby this "region of interest" need not be symmetrically located relative to the optical axis. During detection beam sweep, this displacement factor as well as the zoom magnification in the direction of the detector are once more cleared so that the observation of specific regions in a specimen is possible. In addition to this, images from different "regions of interest" can be acquired and subsequently recomposed into an especially highly resolved image.

An especially purposeful mode of construction of the optical zoom system uses four optical groups to implement variable pupil imaging. For the sake of manufacturing, it is favorable to provide the four optical groups, as seen in the direction of illumination, with positive refracting power, with negative refracting power as well as twice with positive refracting power. Purposefully, at least three of the optical groups are individually and independently adjustable by means of drives, and the displacement occurs in such a manner that the focus from infinite to infinite remains intact and depending on the mode of operation, the magnification or image length (pupil position) is adjusted. It can also be advantageous to design the last group, as seen in the direction of illumination, as one unit together with a scanning objective that is standard to a confocal scanning electron microscope, said scanning objective being positioned in front of the scanner unit. Each group is preferably comprised of at least one lens. In order to achieve the best possible characteristics in terms of available spectral range as well as possible apertures/field angles, the groups preferably have self-correcting capabilities in terms of image defects/imaging errors.

The mentioned selection of a "region of interest" either exclusively by way of the zoom function realized by the zoom objective, or also in addition to that, by way of an asymmetrical scanning mode of operation in the possible scanned field can further be improved by the use of an element that rotates the beam path. If, for example, an Abbe König prism is inserted into the pupil of the illuminating beam path, then the scanned, zoomed scan field can be rotated. In the detection beam path (mode), this rotation is once again cleared by the prism. Such an Abbe König prism can be obtained, for example, from LINOS Photonics, Germany and is known in the state of the art. For the mentioned design, it is rotatably arranged in the beam path, in proximity of the pupil since the beam cones converge at their narrowest here, and therefore an especially small prism can be used. Depending on the rotational angle, it introduces a rotation around the double angle of the image field.

BRIEF DESCRIPTION OF THE DRAWINGS

In the following, the invention shall be more closely detailed in an exemplary manner while referring to the drawing. Are shown in.

DETAILED DESCRIPTION OF THE PREFERRED EMBODIMENTS

Figure 1:
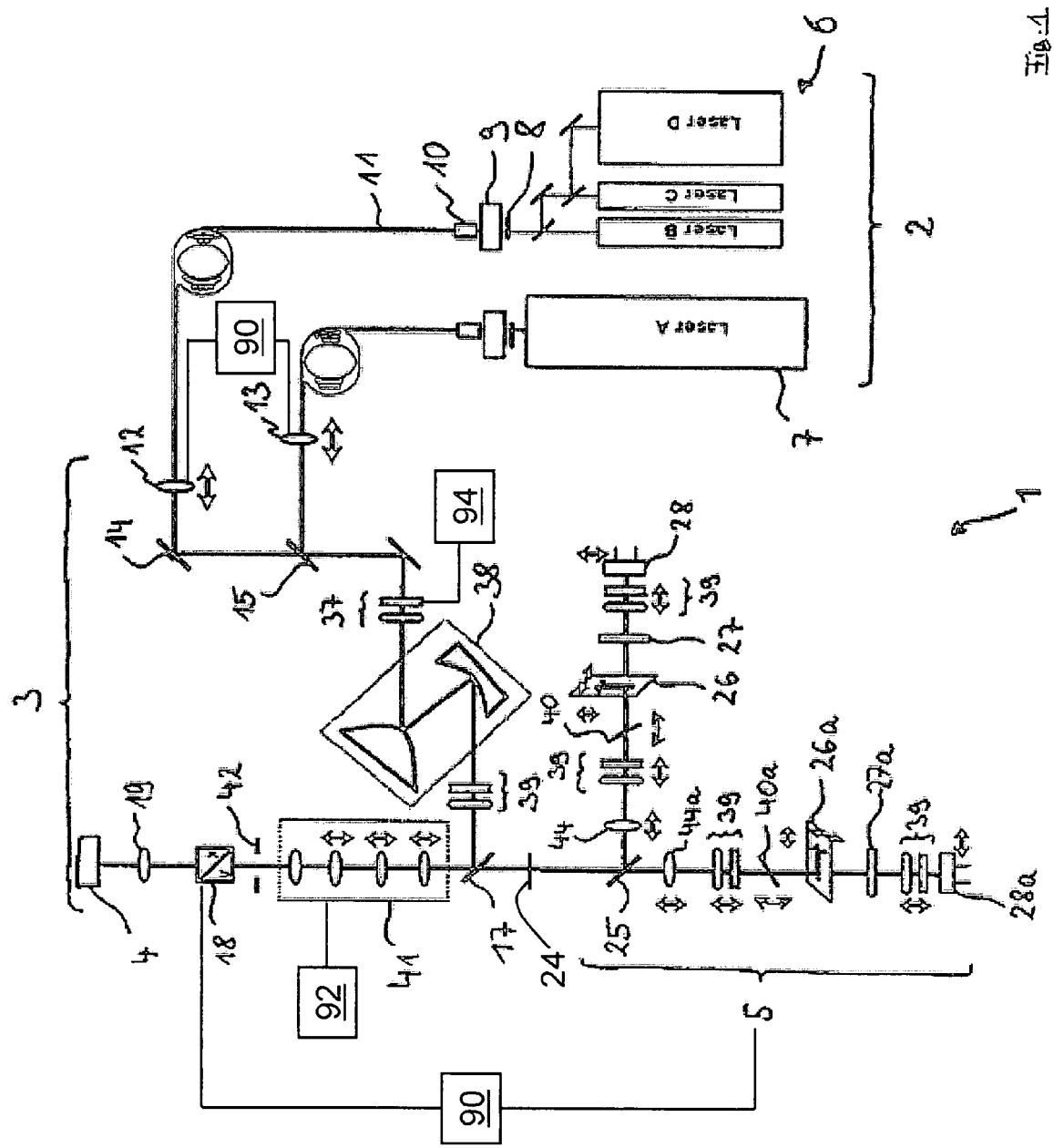
FIG. 1 a schematic representation of a laser scanning microscope with beaming source module, scanning module as well as detector module, FIG. 2 a schematic representation of the beam path between the optical zoom system provided in the laser scanning microscope in FIG. 1 and the specimen acquired with the laser scanning microscope, FIG. 3 a curve for visualizing pupil diameters in the construction in accordance with FIG. 2, FIGS. 4a, 4b and 5a, 5b as well as 6a, 6b various settings on the optical zoom system of FIG. 2, wherein the figures designated with b show a sectional representation which is rotated by 90° as compared to the figures designated by a, FIG. 7 a diagram with the positioning of the four optical groups of the optical zoom system in FIGS. 4 through 6 for a first mode of operation with constant imaging length, FIG. 8 a diagram with the setting of the four optical groups for a second mode of operation with constant magnification, FIG. 9 a representation similar to FIGS. 7 and 8, however for a mode of operation with synchronous variation in imaging length and magnification, FIG. 10 a schematic representation of a scanned field for visualizing possible zooming effects, FIG. 11 a schematic representation of a laser scanning microscope with a Nipkow disc, FIG. 12 a schematic representation of a laser scanning microscope with parallel multiple spot illumination and scanning.

FIG. 1 schematically shows a laser scanning microscope 1, which is basically comprised of five components: of a beaming source module 2, which generates excitation radiation for laser scanning microscopy, of a scanning module 3, which conditions the excitation radiation and properly deflects it for scanning over a specimen, of a microscope module 4, only schematically shown for the sake of simplification, which directs the scanning beam made available by the scanning module in a microscopic beam path over the specimen, as well as of a detector module 5, which receives and detects optical irradiation from the specimen. The detector module 5 can hereby be spectrally designed to have multiple channels, as represented in FIG. 1.

The beaming source module 2 generates illuminating radiation, which is suited for laser scanning microscopy, more specifically, radiation which can release fluorescence. Depending on the application, the beaming source module exhibits several sources of radiation to this end. In a represented form of embodiment, two laser units 6 and 7 are provided in the beaming source module 2, after which are connected on the load side a light valve 8 as well as an attenuator 9 and which couple their radiation into a fiber optical wave guide 11 via a coupling point 10. The light valve 8 acts as a beam deflector by which beam cut-out can be affected without having to switch off the operation of the very lasers in the laser unit 6 or 7. The light valve 8 is designed as an AOTF which deflects the laser beam, before coupling into the fiber optical wave guide 11, in the direction of a light trap, not represented here, for the purpose of cutting out the beam.

Figure 7:
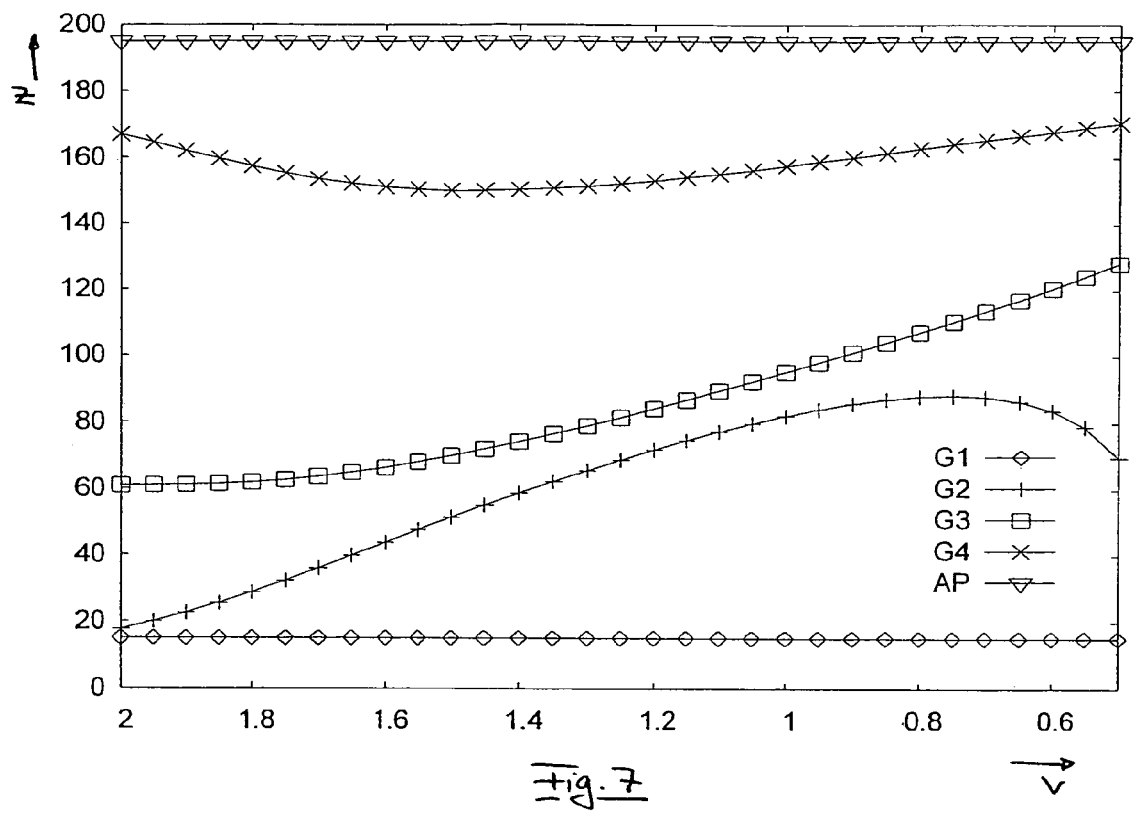

In the exemplary representation of FIG. 1, the laser unit 6 exhibits three lasers B, C, D, whereas laser unit 7 only comprises one laser A. The representation in FIGS. 6 and 7 is thus exemplary of a combination of single and multiple wave length lasers which are individually or also collectively coupled to one or several fiber optics. Coupling can also be done simultaneously via several fiber optics whose radiation is mixed by a color combiner at a later point after running through an optical adaptor. In this manner, it is possible to make use of the most varied wavelengths or wavelength ranges for excitation radiation.

The radiation coupled into the fiber optical wave guide 11 is concentrated by means of optical collimation systems 12 and 13 sliding over beam combining mirrors 14, 15 and is modified in terms of its beam profile in a beam forming unit.

The collimators 12, 13 ensure that the radiation conducted from the beaming source module 2 to the scanning module 3 is collimated into an infinite beam path. In each case, this is advantageously achieved by a single lens which, under the control of a central control unit 90, has a focusing function by its displacement along the optical axis in that the distance between the collimator 12, 13 and the respective end of the fiber optical wave guide is modifiable.

The beam forming unit, which shall later be explained in more detail, generates a column-shaped beam from the rotationally symmetrical, Gaussian profiled laser beam, as it exists emergent from the beam combining mirrors 14, 15, said column-shaped beam no longer being rotationally symmetrical in its profile but rather suited for generating an illuminated rectangular field.

This illuminating beam, also referred to as column-shaped, serves as excitation radiation and is guided to a scanner 18 via a primary color splitter 17 and via an optical zoom system, yet to be described. The primary color splitter shall also be detailed later, but let it just be mentioned here, that it has the function of separating the excitation radiation from the irradiation returning from the specimen that originated from the microscope module 4.

The scanner 18 deflects the column shaped beam into one or two axes, after which said beam passes through a scanning objective 19 as well as through a tube lens and an objective of the microscope module 4 to be bundled into a focus 22, which lies in a preparation or in a specimen 23. The optical image is hereby produced such that the specimen is illuminated in a focal line with excitation radiation.

Fluorescent radiation excited in the linear focus in such a manner arrives, via the objective and the tube lens of the microscope module 4 and via the scanning objective 19, back at the scanner 18 so that in the opposite direction after the scanner 18, a beam once more at rest is to be found. One therefore also speaks of it in such terms that the scanner 18 descans the fluorescent radiation.

The primary color splitter 17 lets the fluorescent radiation lying in wave length ranges other than those of the excitation radiation pass so that it can be rerouted via the deflecting mirror 24 into the detector module 5 and then be analyzed. The detector module 5 exhibits in the form of embodiment in FIG. 1 several spectral channels, that is to say, the fluorescent radiation coming from the deflecting mirror 24 is divided into two spectral channels in a secondary color splitter 25.

Each spectral channel comprises a slotted aperture 26 which produces a confocal or partially confocal image of the specimen 23 and whose aperture size establishes the depth of focus with which the fluorescent radiation can be detected. The geometry of the slotted aperture 26 therefore determines the microsectional plane within the (thick) preparation from which fluorescent radiation is detected.

Arranged after the slotted aperture 26 is also a blocking filter 27, which blocks off undesirable excitation radiation arriving at the detector module 5. The column-shaped fanned-out beam separated off in such a manner, originating from a specific depth segment is then analyzed by an appropriate detector 28. The second spectral detection channel is also constructed in analogy to the depicted color channel, and also comprises a slotted aperture 26a, a blocking filter 27a as well as a detector 28a.

The use of a confocal slotted aperture in the detector module 5 is only exemplary. Of course, a point to point positioning scanner can also be produced. The slotted apertures 26, 26a are then replaced by pinhole apertures and the beam forming unit can be omitted. Incidentally, all of the optical components for such a construction are designed to be rotationally symmetrical. Then also, instead of single spot scanning and detection, basically random multiple point configurations can be used such as point clusters or Nipkow disc concepts, as shall yet be detailed later by way of FIGS. 11 and 12. However, it is then essential that the detector 28 have positional resolution since parallel acquisition is affected on several probing spots by the scanner during sweeping.

In FIG. 1 it can be seen that the Gaussian bundle of rays, occurring after the movable, that is to say, sliding collimators 12 and 13, is made to converge via stepped mirrors in the form of beam combining mirrors 14, 15 and with the construction shown, comprising a confocal slotted aperture, is then subsequently converted into a bundle of rays with a rectangular beam cross profile. In the form of embodiment in FIG. 1, a cylinder telescope 37 is used in the beam forming unit, after which is arranged an aspherical unit 38 followed by a cylindrical lens system 39.

After reshaping, a beam is obtained which, on a sectional plane, basically illuminates a rectangular field wherein the distribution of intensity along the longitudinal axis of the field is not Gaussian shaped but rather box shaped.

The illumination configuration with the aspherical unit 38 can simultaneously serve to fill the pupil between a tube lens and an objective. By such means, the optical resolution of the objective can be fully exploited. This variant is therefore equally purposeful in a single spot or multiple spot scanning microscope system, e.g., in a line scanning system (in the case of the latter, in addition to the axis in which the focus is on or in the specimen).

The excitation radiation transformed into a line, for example, is guided to the primary color splitter 17. Said splitter is designed in a preferred form of embodiment as a spectrally neutral splitter mirror in accordance with the German patent DE 10257237 A1, the contents of whose revelation are fully integrated here. The concept of "color splitter" also covers splitter systems acting in a non-spectral manner. In place of the described spectrally independent color splitter, a homogeneous neutral splitter (e.g., 50/50, 70/30, 80/20 or such similar) or a dichroic splitter can also be used. In order to make an application based selection possible, the primary color splitter is preferably to be provided with mechanics that make a simple change possible, for example by a corresponding splitter wheel which contains individual, interchangeable splitters.

A dichroic primary color splitter is especially advantageous in the case when coherent, that is to say, when oriented radiation is to be detected such as, for example, Stoke's or anti-Stoke's Raman spectroscopy, coherent Raman processes of higher order, general parametric non-linear optical processes such as second harmonic generation, third harmonic generation, sum frequency generation, two photon absorption and multiple photon absorption or fluorescence. Several of these processes from non-linear optical spectroscopy require the use of two or of several laser beams that are co-linearly superimposed. To this end, the described unification of beams from several lasers proves to be especially advantageous. Basically, the dichroic beam splitters widely used in fluorescence microscopy can be applied. It is also advantageous for Raman spectroscopy to use holographic notch splitters or filters in front of the detectors to suppress Rayleigh scattering.

In the form of embodiment in FIG. 1, the excitation radiation or the illuminating radiation is guided to the scanner 18 via a motor driven optical zoom system 41. With this setup, the zoom factor can be adjusted and the scanned visual field is continuously variable within a specific range of adjustment. Especially advantageous is an optical zoom system in which the position of the pupil is maintained throughout the continuous tuning process while the focal position and the image dimensions are being adjusted. The three degrees of freedom of the motor 92 for the optical zoom system 41, represented in FIG. 1 and symbolized by the arrows, exactly correspond to the number of degrees of freedom provided for the adaptation of the three parameters, the image dimensions, the focal position and pupil position. Especially advantageous is an optical zoom system 41 with a pupil on whose exit face a stationary aperture 42 is arranged. In a simple and practical embodiment, the aperture 42 can also be provided by the delimitation of the mirror surface of the scanner 18. The exit face aperture 42 with the optical zoom system 41 achieves the following:

that independent of the adjustment made on zoom magnification, there is always a fixed pupil diameter formed on the scanning objective 19. Thereby, the objective's pupil remains completely illuminated even during random selection on the optical zoom system 41. The use of an independent aperture 42 advantageously prevents the incidence of undesirable stray radiation in the range of the scanner 18.

The cylindrical telescope 37 works together with the optical zoom system 41, said telescope also being activated by a motor 94 and connected before the aspherical unit 38. It is selected in the form of embodiment presented in FIG. 2 for reasons of compactness, but this need not be the case.

If a zoom factor of less than 1.0 is desired, the cylindrical telescope 37 is automatically pivoted into the optical path of the beam. Said telescope prevents the aperture diaphragm 42 from being incompletely illuminated when the zoom objective 41 setting is scaled down. The pivotable cylindrical telescope 37 thereby ensures that even with zoom factor settings of less than 1, that is to say, independent of any adjustment change in the optical zoom system 41, there will always be an illuminated line of constant length on the locus of the objective's pupil. As compared to a simple visual field zoom, losses in laser performance as expressed in the laser's illuminating beam are avoided owing to this.

Since an image brightness jump cannot be avoided in the illumination line when the cylindrical telescope 37 is being pivoted, it is provided in the control unit 90, that the feed rate of the scanner 18 or the gain factor for the detectors in the detector module 5 is adapted accordingly when the cylindrical telescope 37 is activated so that the image brightness can be maintained at a constant.

In addition to the motor driven optical zoom system 41 as well as to the motor activated cylindrical telescope 37, there are also remote controlled adjusting elements provided in the detector module 5 of the laser scanning microscope in FIG. 1. To compensate for longitudinal color errors, for example, are provided, before the slotted aperture, a circular lens 44 as well as a cylindrical lens system 39, and directly before the detector 28, a cylindrical lens system 39, all of which are respectively motor driven to slide in the axial direction.

Additionally provided for the sake of compensation is a correcting unit 40 which shall briefly be described in the following.

The slotted aperture 26 forms, together with a circular lens 44 arranged in front of it as well as with the equally prearranged first cylindrical lens system 39 as well as with the subsequently arranged second cylindrical lens system, a pinhole objective of the detector assembly 5, wherein the pinhole here is realized by the slotted aperture 26. In order to avoid the unwanted detection of reflected excitation radiation in the system, there is yet a blocking filter 27 that is connected in advance of the second cylindrical lens 39, which enjoys the proper spectral characteristics to exclusively admit desirable fluorescent radiation to the detector 28, 28a.

A change in the color splitter 25 or in the blocking filter 27 unavoidably causes a certain tilt or wedge error during pivoting. The color splitter can cause an error between the probed region and the slotted aperture 26; the blocking filter 27 can cause an error between the slotted aperture 26 and the detector 28. To avoid the necessary readjustment of the position of the slotted aperture 26 or of the detector 28, a plane parallel plate 40 is arranged between the circular lens 44 and the slotted aperture 26, that is to say, in the imaging beam path between the specimen and the detector 28, so that said plate can be brought into various rocking positions by activation of a controller. The plane parallel plate 40 is adjustably mounted in a holding fixture suited to this end.

Figure 2:
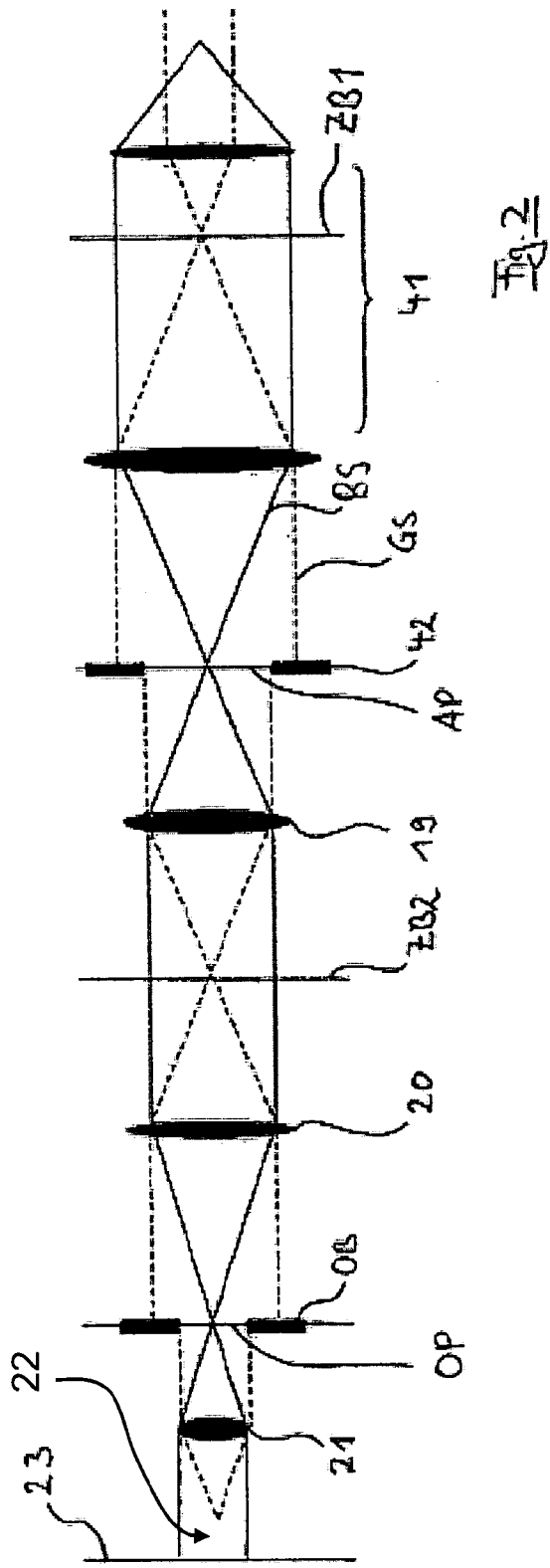

FIG. 2 schematically shows a possible form of embodiment for the beam path in FIG. 1 between the primary color splitter 17 and a specimen 23 arranged in the microscope module 4. The optical zoom system 41, which is only depicted in FIG. 2 as comprised of two elements for the sake of simplification, effects in the illumination beam path IB [BS] a pupil image. At the same time in the object beam path OB [GS], designated by the dashed line in FIG. 2, an intermediate image II 1 [ZB1] is formed in the optical zoom system 41. The optical zoom system focuses from infinite to infinite. The exit pupil Ex.P [AP] of the optical zoom system 41 is purposefully circumscribed by the aperture 42, as previously mentioned, so that independent of any setting adjustments on zoom magnification, there is always a fixed pupil diameter on the subsequently arranged scanning objective 19. In the microscope module 4, between the tube lens 20 and the objective 21, in the objective's pupil OP, is arranged an objective aperture OA [OB] which is filled by or even completely illuminated by the exit pupil Ex.P [AP]. Owing to this, the maximum objective resolution can be achieved.

Figure 3:
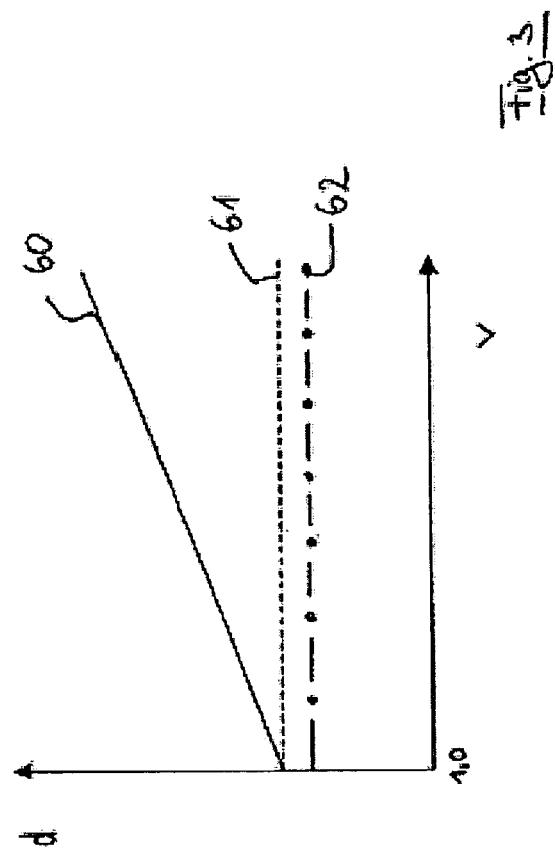

FIG. 3 shows the effect of the aperture 42 for filling the objective's pupil OP [OP]. In reference to this in the diagram of FIG. 3, on the vertical axis, the pupil diameter d is entered and on the horizontal axis, the magnification m [v] affected by the optical zoom system 41 is entered. Curve 60 shows the function according to which the pupil diameter would change without the aperture 42. The dashed line 61 shows the pupil diameter with the aperture 42 in dependency on magnification m [v]. Finally, the dashed-dotted line 62 visualizes the course of the pupil diameter of the objective's pupil OP [OP]. As can be seen, by virtue of the objective aperture OA [OB], which is smaller than the aperture 42, the objective's pupil is independent of magnification m [v]. Naturally, the objective aperture OA [OB] can also be designed with corresponding versions in the objective 21; but it need not be a separate component.

The FIGS. 4a/4b, 5a/5b as well as 6a/6b show different settings for the zoom objective 41, whereby said representation is inverted as compared to that in FIG. 2, that is to say, the direction of illumination runs from left to right in FIGS. 2 through 6. Furthermore, for the sake of simplification, the scanner 18 is not depicted in FIGS. 4 through 6, nor in FIG. 2 as well. As can be seen in the exemplary manner of construction represented in FIGS. 4 through 6, the zoom objective is comprised of four optical groups G1 through G4, whereby group G1 has positive refracting power and is stationarily secured. The second group G2 has negative refracting power and is moved together with groups G3 and G4 which once more have positive refracting power. The movement is affected in such a manner that focusing from infinite to infinite is maintained and magnification or pupil position is set, depending on the mode of operation.

Furthermore, in an exemplary variant it is purposeful to design group G1 with the scanning objective following as a unit; in this variant, the scanning objective is thus positioned before the scanner in the direction of illumination (not shown in FIGS. 4 through 6).

Each group is comprised of at least one lens. To satisfy the requirements for the desired spectral ranges as well as for the targeted aperture/field angle, the groups are self-correcting, to the extent possible, in terms of imaging errors.

Figure 8:
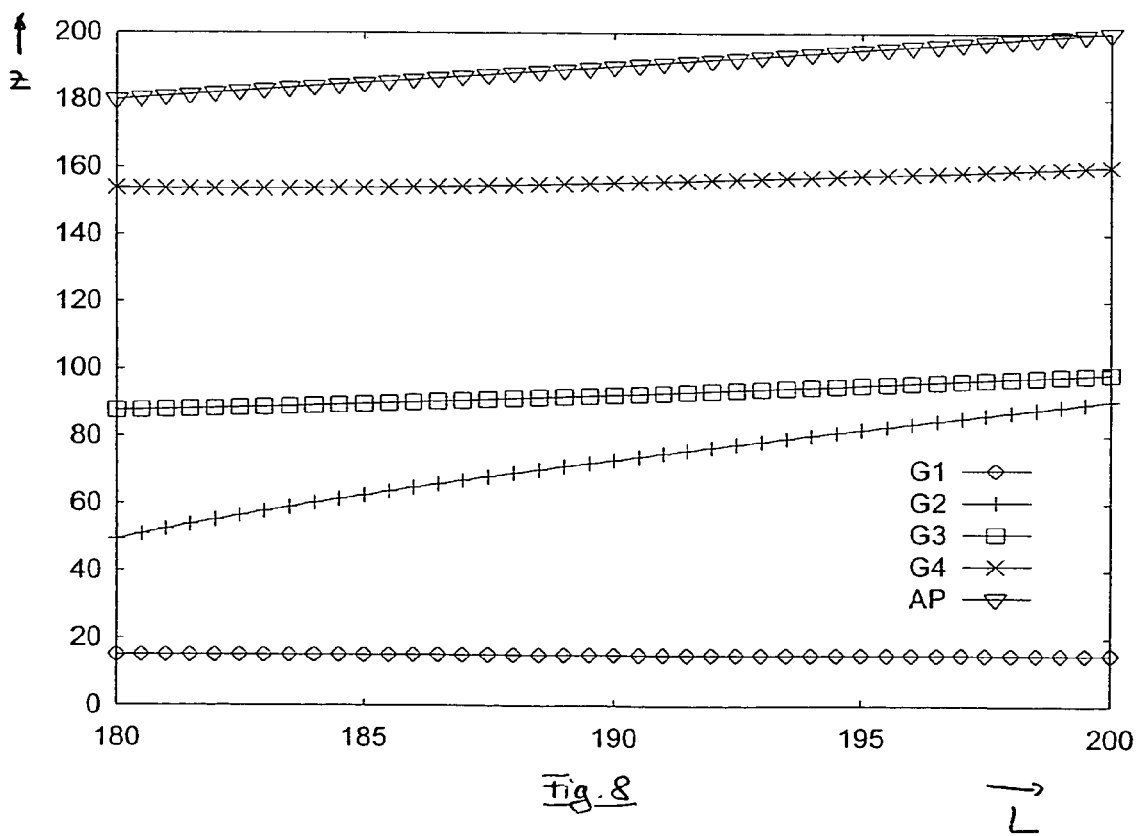
Figure 9:
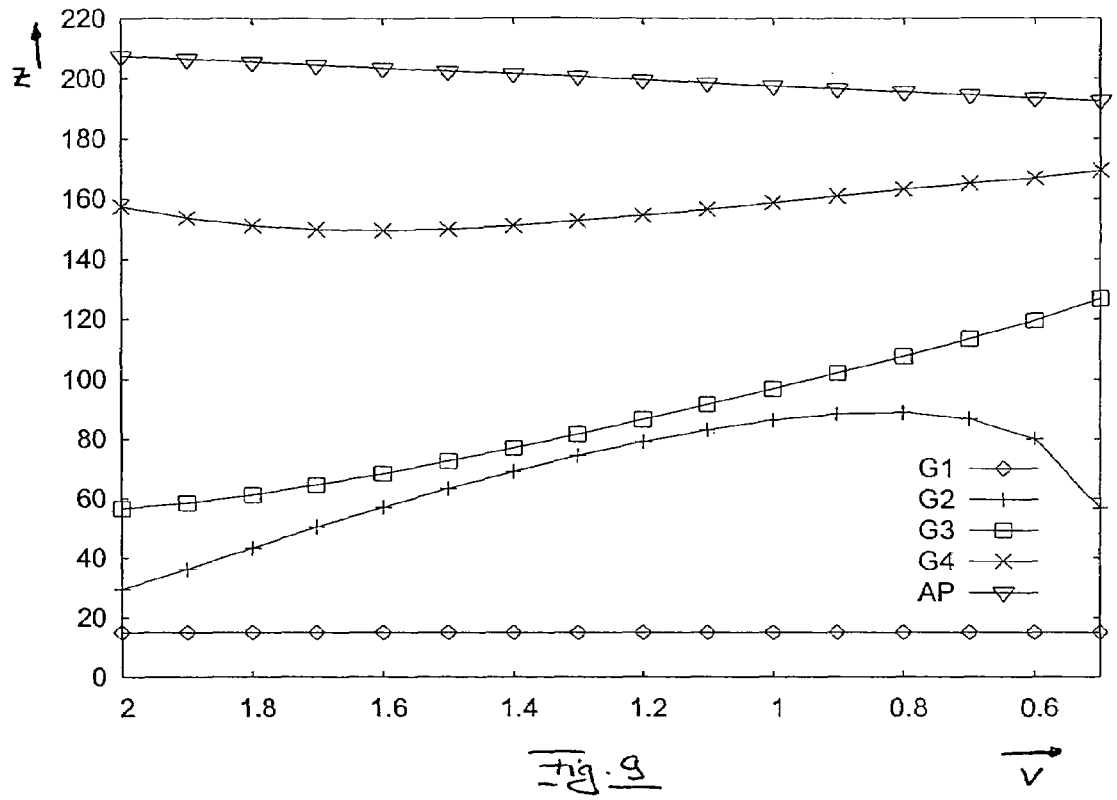

FIGS. 7 through 9 schematically and exemplarily show the optical movement of the zoom lens systems in the groups G1 through G4, whereby the focal distances are as follows: focal distance of G1, 45 mm; focal distance of G2, 153 mm; focal distance of G3, 45 mm; focal distance of G4, 89 mm. The focal distances are scaled to the transmission length L.

For the sake of visualization in FIGS. 4 through 6, the position of the exit pupil Ex.P [AP] is also drawn in as well as that of the entrance pupil En.P [EP]. The transmission length L is defined as the distance between the entrance pupil EnP [EP] and the exit pupil Ex.P [AP]. Furthermore, in FIG. 4a, the z-coordinate is entered, which is measured along the optical axis, for the four groups G1 through G4. The entrance pupil is hereby set to the 0 position.

The figures designated with "a" respectively show a sectional plane which is rotated by 90° as compared to the figures designated with "b". Thus, FIGS. 4a, 5a and 6a contain the pupil beam path and FIGS. 4b, 5b and 6b the object beam path. Based on the confocal slotted aperture configuration with linear illumination used in the exemplary embodiment, a line is always present in the object beam path in those cases when there is a pupil in the pupil beam path, or in FIGS. 4a, 5a, 6a, when there is a nodal point. In another type of confocal imaging (e.g., with Nipkow disc, multiple spot scanner, single spot scanner) the interrelations are different.

In FIGS. 5a/5b, a magnification factor of m [v]=1.4 is set, whereas the setting in FIGS. 6a/6b affects a magnification of m [v]=2.0 at the same imaging length. As compared to the imaging lengths in FIGS. 5 and 6, the imaging length has been extended by 10 mm for the setting in FIGS. 4a/4b at the same magnification factor as in FIGS. 5a/5b. The position of the exit pupil Ex.P. [AP] drawn into the figures clearly shows this.

The zoom objective 41 can therefore be operated in two different modes of operation. On the one hand, it is possible to change the setting for magnification m [v] while maintaining a constant imaging length L. A change in the position drawn in FIGS. 5a/5b to the position in accordance with FIGS. 6a/6b represents, for example, operation in the first mode of operation which produces a scanning field zoom. The settings possible for this in groups G2 through G4 can be seen in FIG. 7, in which the coordinates of the groups G1 through G4 are entered along the z-axis, as represented in FIG. 4a, as a function of magnification m [v].

The concept of "magnification" once more relates to the effect of the optical zoom system 41, that is to say, to the magnification of the image. An image magnification is then attained when the optical zoom system has indeed achieved a reduction of the image transmitted by the illumination source in the direction of illumination, that is to say, for example, when a focal line has been shortened. In contrast, in the direction counter to illumination, that is to say, in the direction of detection, an enlargement takes place.

FIG. 8 shows a second mode of operation which changes the transmission length while maintaining constant magnification. Since the entry has been made in millimeters along the z-axis, one can clearly see that the transmission length can be varied, e.g., by up to 20 mm, when the setting on the optical zoom system has been changed. The position of the exit pupil Ex.P. [AP] shifts from 180 to 200 mm in contrast to that of the entrance pupil (situated at 0 mm). The values in FIG. 8 relate to a change in the transmission length at a magnification factor of 1.0.

FIG. 9 shows a mode of operation which is comprised of a combination of the above-mentioned first mode of operation (FIG. 7) and of the second mode of operation (FIG. 8). With the control of the optical groups G2 through G4 (optical group G1 is once more not changed in its setting) shown in FIG. 9, the magnification m [v] is simultaneously varied with the transmission length L (the latter results from the changed position of the exit pupil in FIG. 9).

Figure 10:
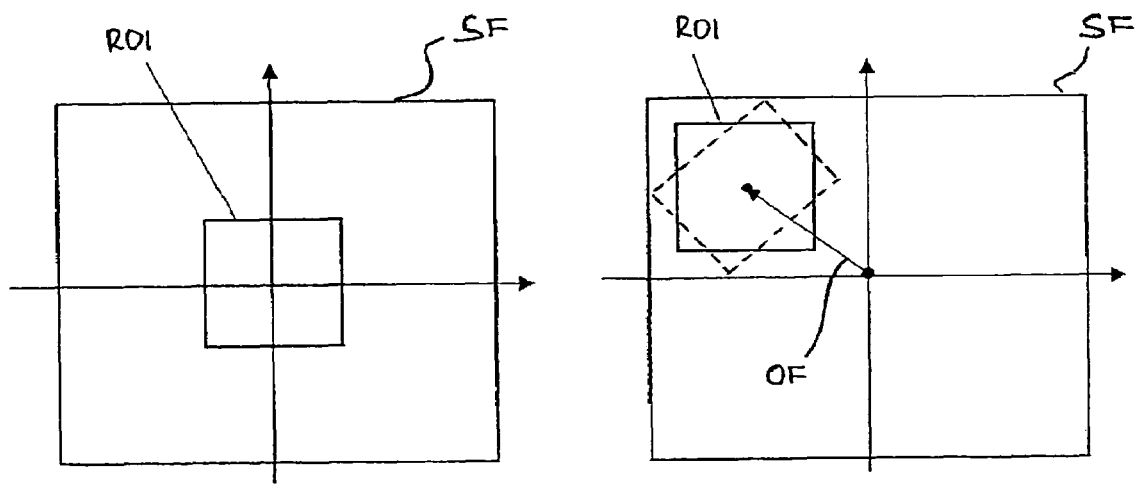

With the help of the optical zoom system 41 and within the maximum scanning field SF available, FIG. 10 shows how a region of interest (ROI) can be selected. If the control setting on the scanner 18 is left such that the amplitude does not change, for example, as is forcibly the case with resonance scanners, a magnification setting greater than 1.0 on the optical zoom system has the effect of narrowing in the selected region of interest (ROI) centered around the optical axis of the scanning field SF. If the scanner is manipulated in such a manner that it scans a field asymmetrically to the optical axis, that is to say, in the resting position of the scanner mirrors, then one obtains an offset displacement OF in the selected region of interest (ROI) in association with the zooming action. Based on the previously mentioned action of the scanner 18, namely of descanning, and based on a repeat run through the optical zoom system 41, the selection of the region of interest (ROI) in the detection beam path is again cleared in the direction of the detector. One can hereby make a selection of the desired region of interest (ROI) within the range offered by the scanning image SF. In addition, for different selections within the region of interest (ROI), one can acquire images and then compose them into an image with high resolution.

If one not only wishes to shift the selected region of interest by the use of an offset OF relative to the optical axis, but also wishes to rotate said region, there is a purposeful form of embodiment which provides for an Abbe König prism in a pupil of the beam path between the primary color splitter 17 and the specimen 23, which obviously leads to the rotation of the image field. This image is also cleared in the direction of the detector. Now one can measure images with different offset displacements OF and with different angles of rotation and after that, they can be computed into a high resolution image, for example, in accordance with an algorithm, as described in the publication by M. Gustafsson, "Doubling the lateral resolution of wide-field fluorescence microscopy using structured illumination" in "Three-dimensional and multidimensional microscopy: Image acquisition processing VII", Proceedings of SPIE, Vol. 3919 (2000), p 141-150.

Figure 11:
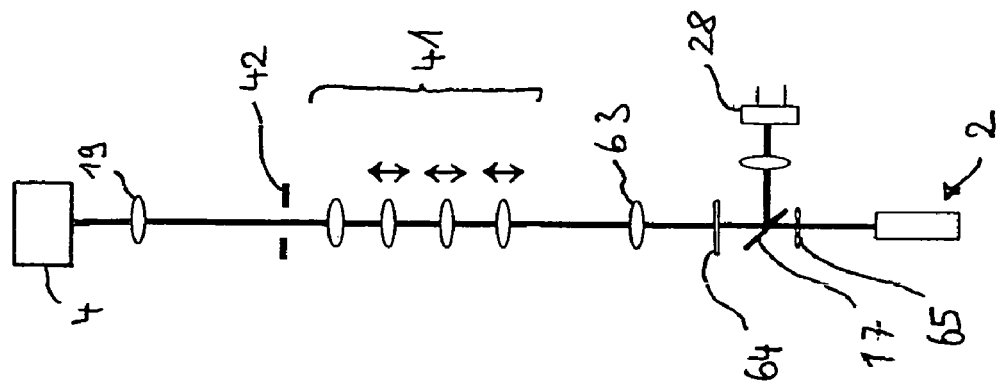

FIG. 11 shows another possible mode of construction for a laser scanning microscope 1, in which a Nipkow disc has been integrated. The light source module 2, which is highly simplified in its representation in FIG. 11, illuminates a Nipkow disc 64, via the primary color splitter 17 in a mini-lens array 65, as described, for example, in the patents U.S. Pat. No. 6,028,306, WO 88 07695 or DE 2360197 A1. The pinholes of the Nipkow disc illuminated via the mini-lens array 65 are imaged onto the specimen located in the microscope module 4. In order to be able to also vary the size of the image on the specimen side, an optical zoom system 41 is again provided here.

As a modified arrangement of the mode of construction in FIG. 2, in the Nipkow scanner, illumination is affected by passing through the primary color splitter 17 and the radiation to be detected is reflected out. Furthermore, as a modified arrangement of FIG. 2, the detector 28 is now designed with regional resolving power so as to also properly enable parallel scanning of the multiple spots illuminated which is achieved by the use of a Nipkow disc 46. Furthermore, between the Nipkow disc 64 and the optical zoom system 41, is arranged an appropriate stationary optical lens system 63 with positive refracting power which transforms the rays divergently exiting through the pinholes of the Nipkow disc 64 into suitable ray bundle diameters. The primary color splitter 17 for the Nipkow construction in FIG. 11 is a classic dichroic beam splitter, that is to say, it is not the aforementioned beam splitter with a slot-shaped or punctiform reflecting region.

The optical zoom system 41 corresponds to the mode of construction previously detailed, whereby the scanner 18 now becomes redundant with the Nipkow disc 64. Nevertheless, said scanner can be provided if one wishes to undertake the selection of a region of interest (ROI) detailed in FIG. 10. The same applies to the Abbe König prism.

Figure 12:
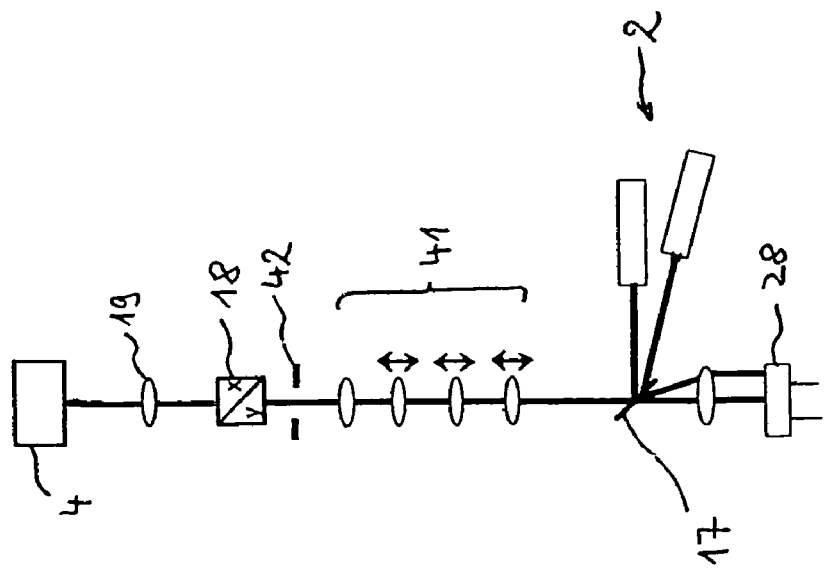

An alternate approach with multiple spot scanning is shown in schematic representation in FIG. 12, in which several light sources obliquely beam into the scanner pupil. Here also, a zooming function can be realized by the use of an optical zoom system 41 for imaging, to be configured between the primary color splitter 17 and the scanner 18, as represented in FIG. 10. By simultaneous beaming of light bundles at different angles on a plane conjugate with the pupil, light spots are produced on a plane conjugate with the plane of the object, which are simultaneously guided by the scanner 18 over subregions of the total object field. Data on the images are generated by the evaluation of all subimages on a matrix detector 28 with mapping resolving power.

As another form of embodiment coming under consideration is multiple spot scanning, as described in the U.S. Pat. No. 6,028,306, whose revelation is fully integrated here in terms of this. Here as well, a detector 28 with positional resolving power is to be provided as in FIGS. 11 and 12. The specimen is then illuminated by a multiple point light source, which is realized by a beam expander with a post-positioned microlens array, which illuminates a multiple aperture plate in such a manner that a multiple point light source is produced.

The described invention represents a significant expansion of the application possibilities for high speed confocal laser scanning microscopes. The significance of such expanded development can be deduced from the standard literature on cell biology and from the processes described there on superfast cellular and subcellular processes and from the applied methods of analysis with a multitude of dyes.

See, for example:
B. Alberts et al. (2002): Molecular biology of the Cell; Garland Science.
G. Karp (2002): Cell and Molecular Biology: Concepts and Experiments; Wiley Text Books.
R. Yuste et al. (200): Imaging neurons—a laboratory Manual; Cold Spring Harbor Laboratory Press, New York.

R. P. Haugland (2003): Handbook of fluorescent Probes and research Products, 10$^{th}$ Edition; Molecular Probes Inc. and Molecular Probes Europe BV.

The invention has an especially great significance for the following processes and developments:

Development of Organisms

The described invention is, among other things, suited for the analysis of developmental processes which are characterized foremost by dynamic processes ranging from tenths of seconds to hours in duration. Exemplary applications are described here, for example, at the level of cell groups and whole organisms:

M. A. Abdul-Karim et al. describe in 2003 in Microvasc. Res., 66: 113-125 a long term analysis of changes in the blood vessels of living animals wherein fluorescent images were recorded at intervals over several days. The 3D data records were evaluated with adapted algorithms to schematically illustrate the trajectories of movement.

D. R. Soll et al. describe in 2003 in Scientific World Journ., 3: 827-841 a software based analysis of movement of microscopic data on the nuclei and pseudopodia in living cells in all 3 spatial dimensions.

R. Grossmann et al. describe in 2002 in Glia, 37: 229-240 a 3D analysis of the movements of microglia cells in rats, whereby the data was recorded for up to 10 hours. At the same time, after traumatic injuries, the neuroglia also react with rapid reactions so that a high data rate and correspondingly large volumes of data are generated.

This applies to the following points of emphasis in particular:

Analysis of living cells in a 3D environment whose neighboring cells sensitively react to laser illumination and which must be protected from the illumination of the 3D-ROI [regions of interest];

Analysis of living cells in a 3D environment with markers, which are subject to targeted 3D bleaching by laser illumination, e.g. FRET experiments;

Analysis of living cells in a 3D environment with markers, which are subject to targeted bleaching by laser illumination, and at the same time, are also to be observed outside of the ROI, e.g., FRAP and FLIP experiments in 3D;

Targeted analysis of living cells in a 3D environment with markers and pharmaceutical agents, which exhibit manipulation related changes by laser illumination; e.g., activation of transmitters in 3D;

Targeted analysis of living cells in a 3D environment with markers, which exhibit manipulation related changes in color by laser illumination; e.g., paGFP, Kaede;

Targeted analysis of living cells in a 3D environment with very weak markers, which require e.g., an optimal balance in confocality against detection sensitivity.

Living cells in a 3D tissue group with varying multiple markers, e.g. CFP, GFP, YFP, Ds-red, Hc-red and such similar.

Living cells in a 3D tissue group with markers, which exhibit function related changes in color, e.g., Ca+-marker.

Living cells in a 3D tissue group with markers, which exhibit development related changes in color, e.g. transgenic animals with GFP Living cells in a 3D tissue group with markers, which exhibit manipulation related changes in color by laser illumination, e.g., paGFP, Kaede Living cells in a 3D tissue group with very weak markers, which require a restriction in confocality in favor of detection sensitivity.

The last mentioned item in combination with the one preceding it.

Transport Processes in Cells

The described invention is excellent in its suitability for the analysis of intracellular transport processes since the truly small motile structures involved here are to be represented, e.g. proteins with high speeds (usually in the range of hundredths of seconds). In order to capture the dynamics of complex transport processes, applications are also often used such as FRAP with ROI bleaching. Examples for such studies are described here, for example:

F. Umenishi et al. describe in 2000 in Biophys. J., 78: 1024-1035 an analysis of the spatial motility of aquaporin in GFP transfected culture cells. To this end, targeted spots were locally bleached in the cell membranes and the diffusion of the fluorescence was analyzed in the surroundings.

G. Gimpl et al. describe in 2002 in Prog. Brain Res., 139: 43-55 experiments with ROI bleaching and fluorescent imaging for the analysis of mobility and distribution of GFP-marked oxytocin receptors in fibroblasts. To realize this task, very high demands are made on spatial positioning and resolution as well as on the direct temporal sequence of bleaching and imaging.

Zhang et al. describe in 2001 in Neuron, 31: 261-275 live cell imaging of GFP transfected nerve cells wherein the mobility of granules was analyzed based on a combination of bleaching and fluorescent imaging. To this end, the dynamics of the nerve cells set very high requirements for the imaging speed.

Molecular Interactions

The described invention is particularly well suited for the representation of molecular and other subcellular interactions. To this end, very small structures with high speeds (in the range of hundredths of seconds) must be represented. In order to resolve the spatial position necessary for the observation of molecular interactions, indirect techniques must also be applied such as, for example, FRET with ROI bleaching. Exemplary applications are, for example, described here:

M. A. Petersen and M. E. Daily describe in 2004 in Glia, 46: 195-206 a two channel visual recording of live hippocampus cultures in rats, whereby the two channels are spatially recorded and plotted in 3D for the markers of lectin and sytox over a longer period of time.

N. Yamamoto et al. describe in 2003 in Clin. Exp. Metastasis, 20: 633-638 a two color imaging of human fibrosarcoma cells, whereby green and red fluorescent proteins (GFP and RFP) are simultaneously observed in real time.

S. Bertera et al. describe in 2003 in Biotechniques, 35: 718-722 a multicolor imaging of transgenic mice marked with timer reporter protein, which changes its color from green into red after synthesis. The recording of the image is affected as a rapid series of 3-dimensional images in the tissue of the live animal.

Transmission of Signals Between Cells

The described invention is excellent and very well suited for the analysis of signal transmission processes that are usually extremely rapid. These predominantly neurophysiological processes set the highest demands on temporal resolution since the activities mediated by ions transpire within the range of hundredths to smaller than thousandths of seconds. Exemplary applications of analyses on the muscle and nervous systems are described here, for example:

G. Brum et al. describe in 2000 in J Physiol. 528: 419-433 the localization of rapid Ca+ activities in muscle cells of the frog after stimulation with caffeine as transmitter. The localization and micrometer-precise resolution succeeded only by virtue of the high speed confocal microscope used.

H. Schmidt et al. describe in 2003 in J Physiol. 551: 13-32 an analysis of Ca+ ions in axons of transgenic mice. The study of rapid Ca+ transients in mice with modified Ca+ binding proteins could only be conducted with a high resolution confocal microscope since both the localization of Ca+ activity within the nerve cell and its exact temporal kinetics play an important role.

The invention claimed is:

1. An optical zoom system for use in a confocal light scanning electron microscope with linear scanning and having an illuminating beam path and an objective for capturing an object to be imaged, the illuminating beam path having an illuminating beam path entrance pupil, and the objective having an objective entrance pupil, the optical zoom system being adapted for positioning in the illuminating beam path in front of the objective, the optical zoom system comprising:
   optical zoom entrance and exit pupils;
   means for adjusting the imaging length;
   means for adjusting the image magnification;
   means for adjusting the distance between the optical zoom entrance pupil and the optical zoom exit pupil in such a manner that an axially varying pupil position of the entrance pupil of the objective can be equilibrated; and
   means for maintaining the position of the objective entrance pupil while the means for adjusting the image magnification and the means for adjusting the imaging length are being adjusted,
   whereby the optical zoom system produces an intermediate image of the object and images the entrance pupil of the illuminating beam path with at least one of a variable magnification and a variable imaging length into the exit pupil.

2. The optical zoom system in accordance with claim 1, wherein the objective has an entrance pupil, and the optical zoom system further comprises:
   size means for affecting the size of the exit pupil independent from a selected setting of the optical zoom system, the size means acting as an aperture, the size of the exit pupil being smaller than the size of the objective entrance pupil.

3. The optical zoom system according to claim 1, wherein the size means is selected from the group consisting of a scanner mirror, an iris diaphragm, and an aperture mechanism having different interchangeable pinhole apertures.

4. The optical zoom system according to claim 1, further comprising:
   control means for adjustably controlling the optical zoom system, for producing variable magnification in a first mode of operation while maintaining a constant image length, and for producing a variable image length in a second mode of operation while maintaining constant magnification.

5. The optical zoom system according to claim 1, further comprising:
   first, second, third, and fourth optical groups, wherein as seen in a direction counter to illumination, the first optical group has positive refracting power, the second optical group has negative refracting power, the third optical group has positive refracting power, and the fourth optical group has positive refracting power, and
   drive means for positioning at least the second, third, and fourth optical groups.

6. The optical system according to claim 5, wherein each of the first, second, third, and fourth optical groups is self-correcting relative to image defects/imaging errors.

7. A confocal scanning electron microscope, comprising:
   scanning means for guiding an illumination beam in the form of a line over an object to be imaged,
   an illuminating beam path having an illuminating beam path entrance pupil,
   an objective for capturing the object to be imaged, the objective having an objective entrance pupil, and
   an optical zoom system adapted positioned in the illuminating beam path in front of the objective and including:
   optical zoom entrance and exit pupils;
   means for adjusting the imaging length;
   means for adjusting the image magnification;
   means for adjusting the distance between the optical zoom entrance pupil and the optical zoom exit pupil in such a manner that an axially varying pupil position of the entrance pupil of the objective can be equilibrated; and
   means for maintaining the position of the pupil while the means for adjusting the image magnification and the means for adjusting the imaging length are being adjusted,
   whereby the optical zoom system produces an intermediate image of the object and images the entrance pupil of the illuminating beam path with at least one of a variable magnification and a variable imaging length into the exit pupil.

8. The confocal scanning electron microscope according to claim 7, further comprising a Nipkow disc providing confocal multiple spot imaging of one of a confocal slotted aperture and a multiple point light source.

9. The confocal scanning electron microscope according to claim 7, further comprising a resonance scanner.

10. The confocal scanning electron microscope according to claim 7, further comprising an Abbe König prism located in the proximity of the exit pupil, the prism being rotatable in the illuminating beam path.

11. A method of analyzing developmental processes, comprising the step of:
   analyzing dynamic processes ranging from tenths of seconds to hours at the level of cell groups and entire organisms, using a confocal scanning electron microscope according to claim 7.

12. A method of analyzing intracellular transport processes, comprising the steps of:
   analyzing small motile structures with high speed, using a confocal scanning electron microscope according to claim 7.

13. A method of analyzing molecular and other subcellular interactions, comprising the steps of:
   analyzing very small structures with high speed for the resolution of submolecular structures, using a confocal scanning electron microscope according to claim 7.

14. A method for studying fast signal transmission processes, comprising the step of:
   studying neurophysiological processes with high temporal resolution in studies in the muscle or nerve system, using a confocal scanning electron microscope according to claim 7.

* * * * *

UNITED STATES PATENT AND TRADEMARK OFFICE
CERTIFICATE OF CORRECTION

PATENT NO. : 7,488,931 B2 Page 1 of 1
APPLICATION NO. : 10/967318
DATED : February 10, 2009
INVENTOR(S) : Ralf Wolleschensky et al.

It is certified that error appears in the above-identified patent and that said Letters Patent is hereby corrected as shown below:

Title Page item 54 and Column 1
Line 2 "electron" should be deleted

Title Page item 57
Line 1 "electron" should be deleted

Column 1
Lines 8, 9, 12, 46 and 50 "electron" should be deleted

Column 2
Line 57 "electron" should be deleted

Column 3
Lines 13 and 19 "electron" should be deleted

Column 4
Line 42 "electron" should be deleted

Column 15
Line 10 "electron" should be deleted

Column 16
Lines 4, 29, 33, 35, 43, 48, 54 and 59 "electron" should be deleted

Signed and Sealed this

Twenty-sixth Day of January, 2010

David J. Kappos
*Director of the United States Patent and Trademark Office*